United States Patent
Jenzeh (10) Patent No.: US 9,902,629 B2
(45) Date of Patent: Feb. 27, 2018

(54) APPARATUS FOR MAGNETIC TREATMENT OF FLOWING FLUIDS

(71) Applicant: Michael Jenzeh, Oakland, CA (US)

(72) Inventor: Michael Jenzeh, Oakland, CA (US)

( * ) Notice: Subject to any disclaimer, the term of this patent is extended or adjusted under 35 U.S.C. 154(b) by 124 days.

(21) Appl. No.: 15/096,152

(22) Filed: Apr. 11, 2016

(65) Prior Publication Data
US 2016/0326028 A1 Nov. 10, 2016

Related U.S. Application Data

(60) Provisional application No. 62/145,751, filed on Apr. 10, 2015.

(51) Int. Cl.
*C02F 1/48* (2006.01)

(52) U.S. Cl.
CPC .......... *C02F 1/482* (2013.01); *C02F 2303/22* (2013.01)

(58) Field of Classification Search
CPC .............................. C02F 1/482; C02F 2203/22
See application file for complete search history.

(56) References Cited

U.S. PATENT DOCUMENTS 6,143,171 A * 11/2000 Van Aarsen .......... B01J 19/087
123/538

* cited by examiner

*Primary Examiner* — David A Reifsnyder
(74) *Attorney, Agent, or Firm* — Brian Beverly; Beeson Skinner Beverly, LLP

(57) ABSTRACT

An apparatus for magnetic treatment of fluids comprises a tubular body which retains a plurality of magnets and which defines an inner flow channel, a plurality of spaced apart positioning rings secured in the flow channel to the body, each positioning ring having including a plurality of annularly distributed, radially extending turbulence fins disposed in alignment with and annularly to a plane perpendicular to the longitudinal dimension of the tubular body, and one or more radially extending support posts, one support post on a first one of the rings having an outwardly-biased retaining pin, and one of the support posts on a second one of the rings including an outwardly-oriented locking nut for locking the second ring flow channel of the tubular body by rotatably extending the nut from the post.

9 Claims, 7 Drawing Sheets

APPARATUS FOR MAGNETIC TREATMENT OF FLOWING FLUIDS

CROSS-REFERENCE TO RELATED APPLICATIONS

This invention claims the benefit of U.S. Provisional Application No. 62/145,751 filed Apr. 10, 2015.

BACKGROUND

Field of the Invention

This invention relates to apparatuses for the magnetic treatment of fluids, particularly water, to reduce particulate contamination.

Background Art

Water, while chemically neutral, is one of the best known solvents. It has the inherent capability to entrap other substances by clustering water molecules around non-water particles. These are known as conglomerations or complexes. The capability of water to entrap substances results in its high mineral content and the amount of dissolved minerals being carried by water determines its hardness.

When water evaporates, the dissolved minerals become over concentrated and begin crystallizing. Crystallization also occurs when the solubility of the minerals in the water decreases. The result of crystallization is sediment forming on the walls of the container holding the water.

Increased amounts of dissolved minerals make water more viscous and less able to penetrate soils and enter the pores and capillaries of plants. Thus, higher amounts of water are needed for crop irrigation and increased amounts of fertilizer are required to compensate for the reduced capacity of plants to hydrate which lowers the bio-availability of oxygen and nutrients.

Magnetic treatment of water has been shown to break the water-particulate complexes. The freed particulate molecules then act as bonding centers and form microcrystals. This process converts water saturated with dissolved minerals into a mixture of solid microcrystals and clean water. When this mixture of purified water and microcrystals flows past other minerals it is capable of dissolving additional minerals. This process reduces or eliminates scaling in pipes and equipment and can protect against corrosion.

Heretofore, mechanisms for magnetically treating water have involved a complex of multiple magnetic treatment units retained in a plurality of apertures on a baffle plate. Each treatment unit has had a limited capacity for holding magnets, if increased levels of dissolved solids are present in water or other fluids to be treated, individual units known in the prior art must be individually installed in a longitudinal series. Turbulence induced in the flow as fluids pass through a magnetic treatment device increase precipitation of scale, but prior art devices have been limited in their ability to induce turbulence in the flow.

There is, therefore, a need for a magnetic treatment apparatus that can be manufactured inexpensively, that is less easy to install, that has the capability of holding more magnets in order to subject the water being treated to higher amounts of magnetic forces for longer periods of time, and that can induce turbulence into the fluid as it flows through the apparatus.

DETAILED DESCRIPTION OF THE ILLUSTRATED EMBODIMENT

Figure 1:
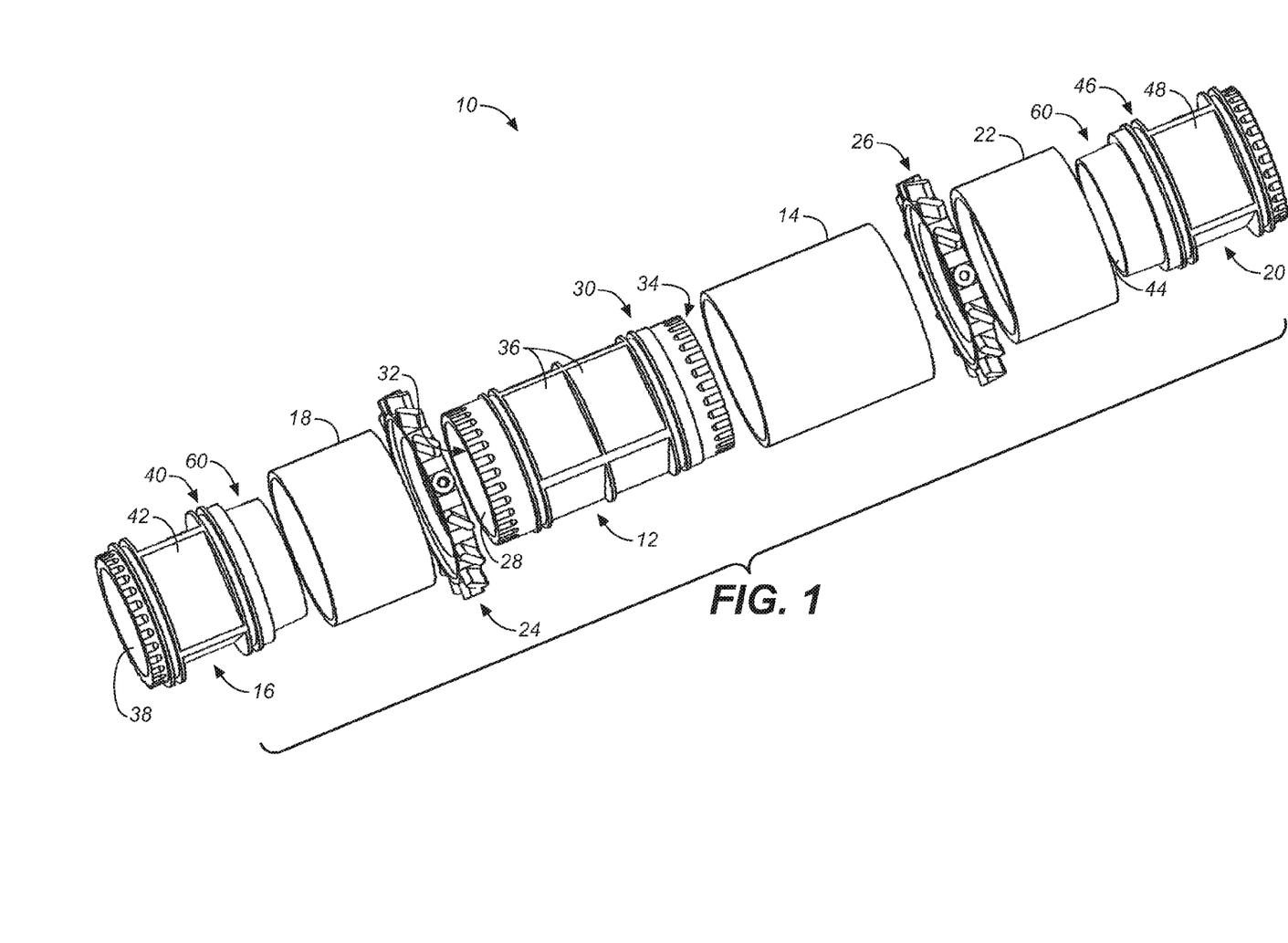
FIG. 1 is an exploded upper perspective view of an apparatus for magnetic treatment of flowing fluids according to the invention.
Figure 1A:
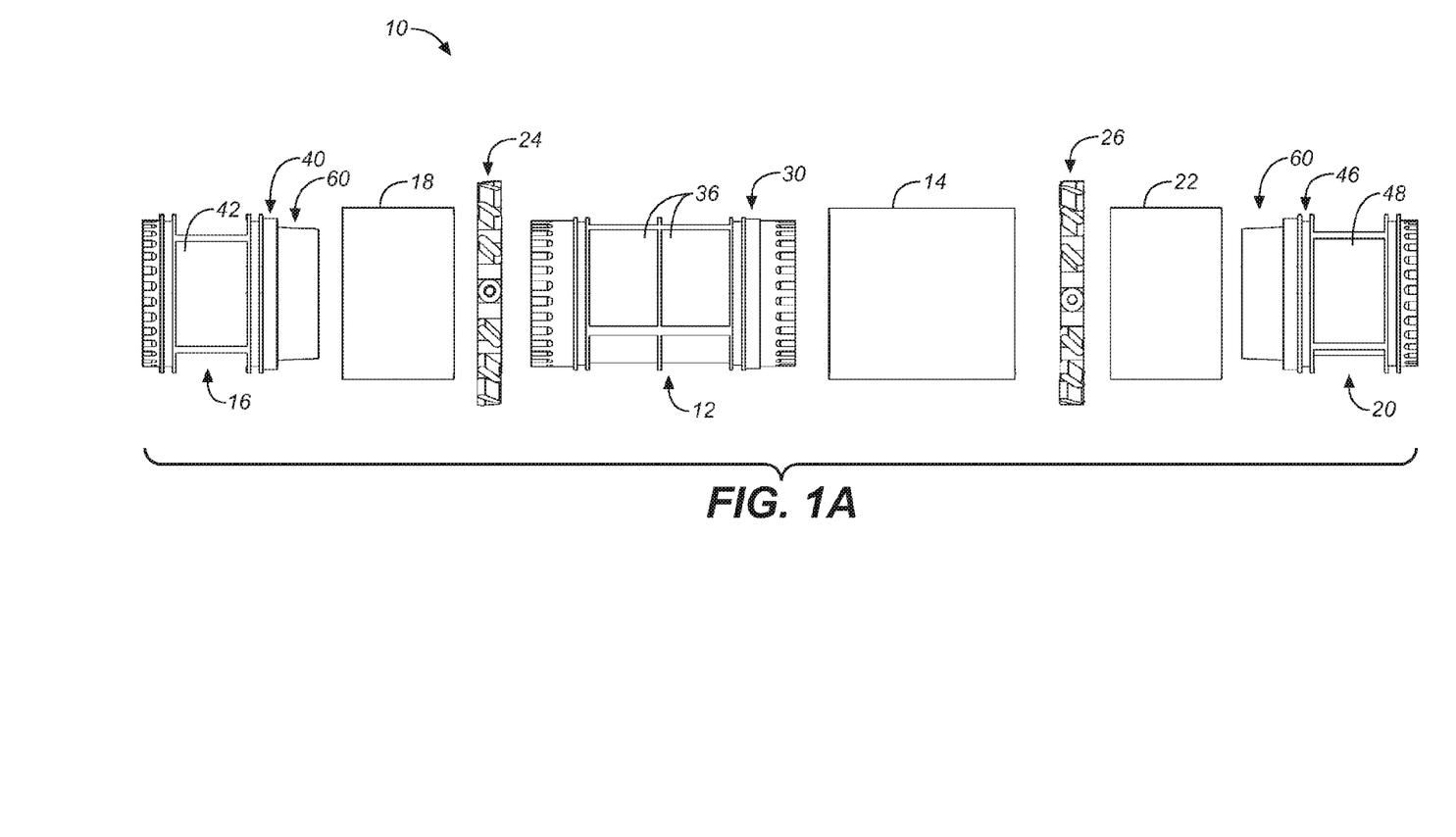
FIG. 1A is an exploded front elevational view thereof.

An apparatus for magnetically treating water according to the invention is referred to generally at numeral 10 in FIG. 1. The apparatus comprises a tubular middle body 12, a middle body sleeve 14, a first end body 16, a first end body sleeve 18, a second end body 20, a second end body sleeve 22, a first spacer ring 24, and a second spacer ring 26.

The middle body 12 includes an inner surface 28, an outer surface 30, a fluid inlet 32, and a fluid outlet 34. A plurality of recesses 36 are provided on the outer surface 30 for retaining magnets (not shown). In the illustrated embodiment, eight recesses 36 are provided for holding magnets, but those of skill in the art will understand that more than or less than eight recesses may be provided within the scope of the invention.

The first end body 16, also includes an inner surface 38 and an outer surface 40. A plurality of recesses 42 are provided on the outer surface 40 for retaining magnets (not shown). The second end body 20 similarly includes an inner surface 44 and an outer surface 46. The outer surface 46 includes a plurality of recesses 48 for holding magnets. In the illustrated embodiment, each of the first and second end bodies 16, 20 is provided with four recesses 42, 48. As with the middle body 12, those of skill in the art will understand that more than or less than four recesses may be provided in the outer surfaces of the end bodies within the scope of the invention.

Figure 2:
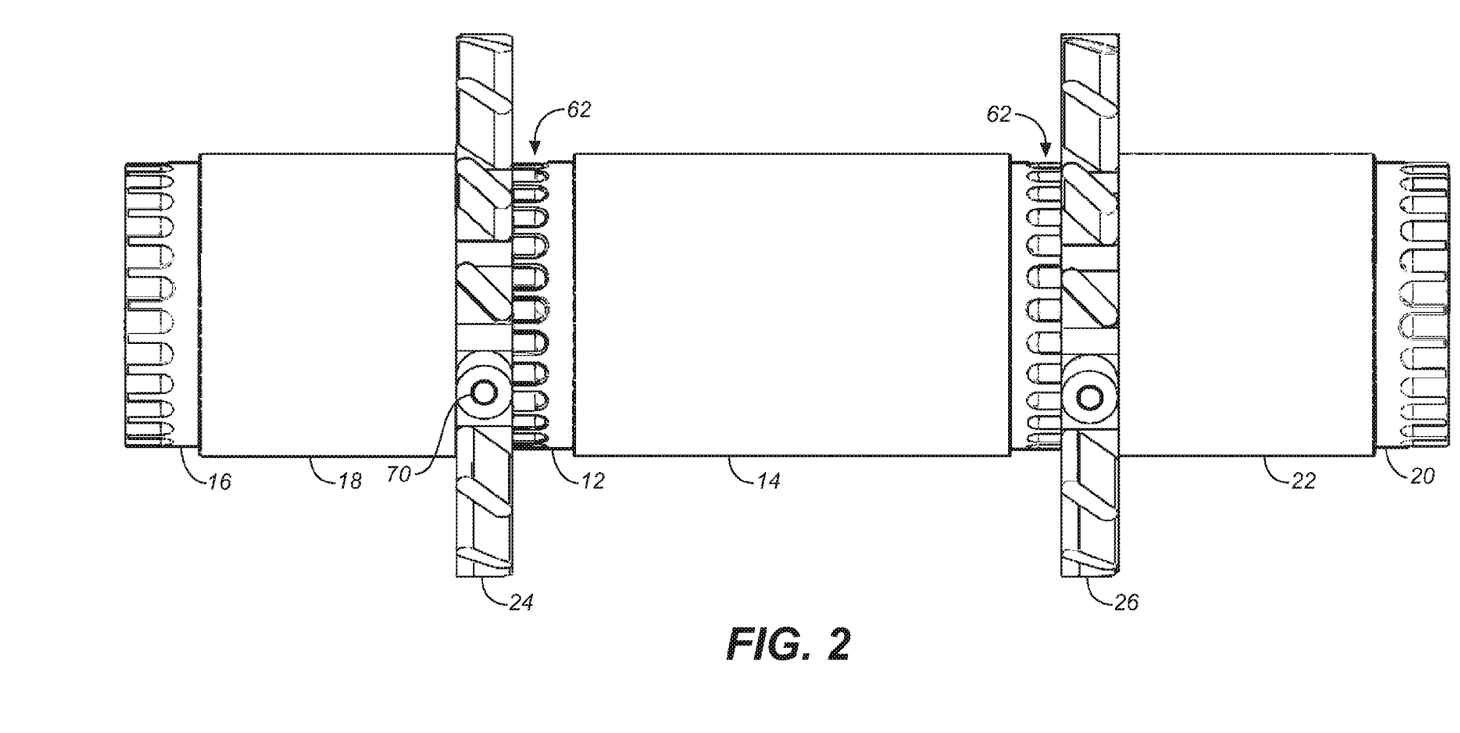
FIG. 2 is a front elevational view thereof showing the device in an assembled configuration.

With additional reference now to FIG. 2, it can be seen that middle body sleeve 14 is threadedly attached to and surrounds middle body 12 thereby capturing magnets disposed in recesses 36. Similarly, first end body sleeve 18 is attached to and surrounds the first end body 16, thereby capturing magnets disposed in recesses 42, and second end body sleeve 22 is attached to and surrounds second end body 20, thereby capturing magnets disposed in recesses 48.

Figure 3:
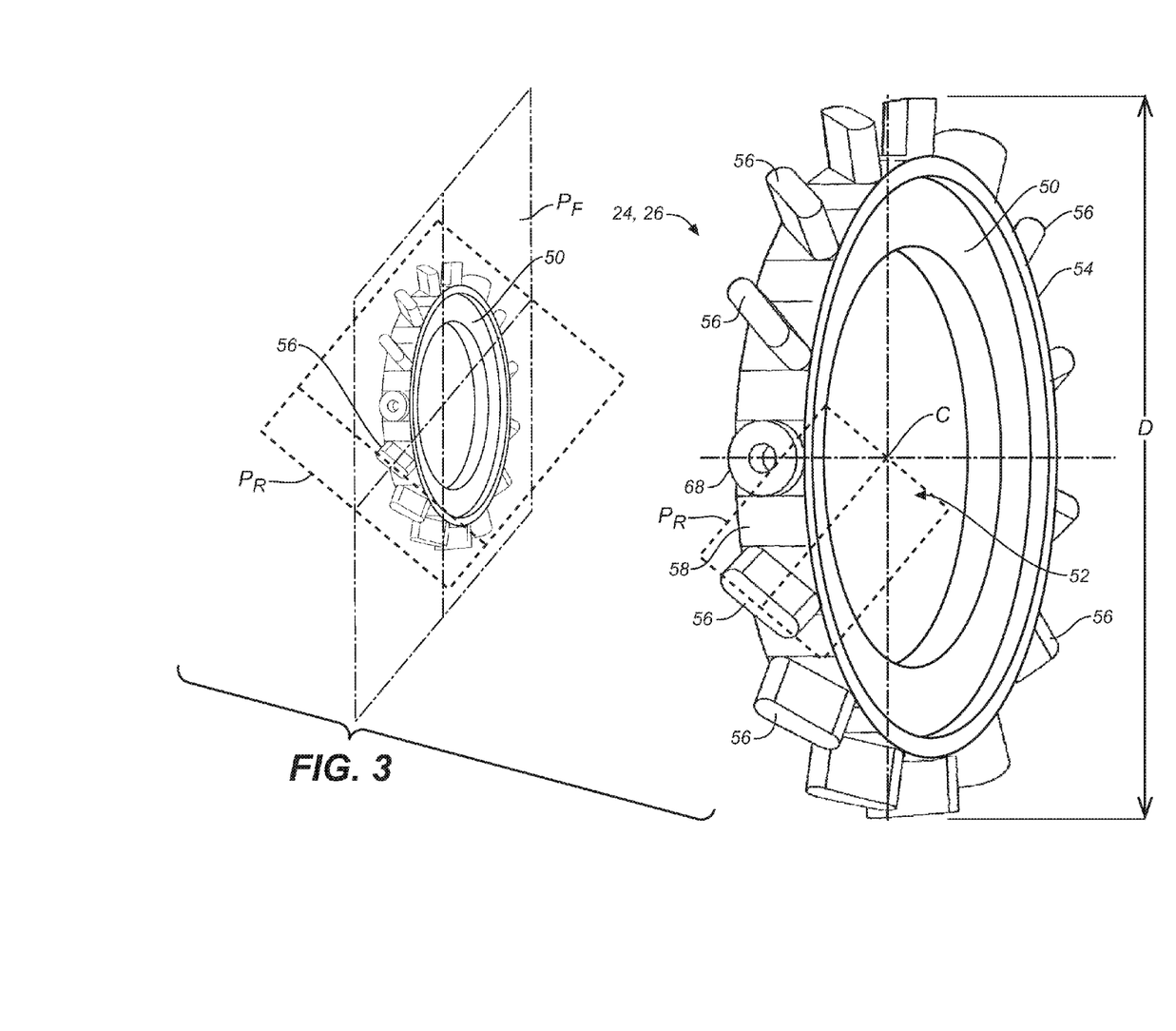
FIG. 3 is a side perspective view of one of the spacer rings of the apparatus.

Referring to FIG. 3, first spacer ring 24 comprises an annular contact plate 50 defining a central aperture 52, and an annular flange 54 projecting perpendicularly from the outer edge of the contact plate 50. A plurality of spacing fins 56 projects outwardly from the generally cylindrical outer surface 58 of flange 54. Each of the spacer fins 56 has an overall planar geometry and is disposed in a plane $P_R$ coincident with the center point C of the spacer ring 24, but is disposed at an angle to a plane $P_F$ parallel to contact plate 50, such that fins 56 radiate from flange 54 angularly similar to the structure of a turbine.

In one embodiment, two or more spacing posts 58 radiate outwardly from flange 54 for the same length as the spacer fins 56 such that the outer edges of fins 56 and spacing posts 58 collectively form an annular outer edge having a diameter D.

Referring to FIGS. 1-3, the proximal end 60 of the first end body 16 is attached to one end 62 of middle body 12, bringing sleeve 18 into annular abutting engagement with one side of contact plate 50 of first spacer ring 24 and bringing end 62 of middle body 12 into abutting engagement with the other side of contact plate 50, thereby capturing spacer ring 24 between end body 16 and middle body 12. The second spacer ring 26 is similarly captured between the second end body 20 and middle body 12. In the illustrated embodiment, the inside of each end 62 is threaded and cooperating threads are provided on the outer surface of the proximal ends 60 of first and second end bodies 16, 20 for threadedly attaching the end bodies 16, 20 to middle body 12. Each of the proximal ends 60 of end bodies 16, 20 has a diameter slightly smaller than the diameter D of the central aperture of each of the spacing rings 24, 26, so that the spacing rings are held in concentric alignment with the middle and end bodies 12, 16, 20. Once assembled, the middle and end bodies 12, 16 & 20, sleeves 14, 18 & 22, and spacer rings 24 & 26 form a rigidly interconnected structure.

Figure 4:
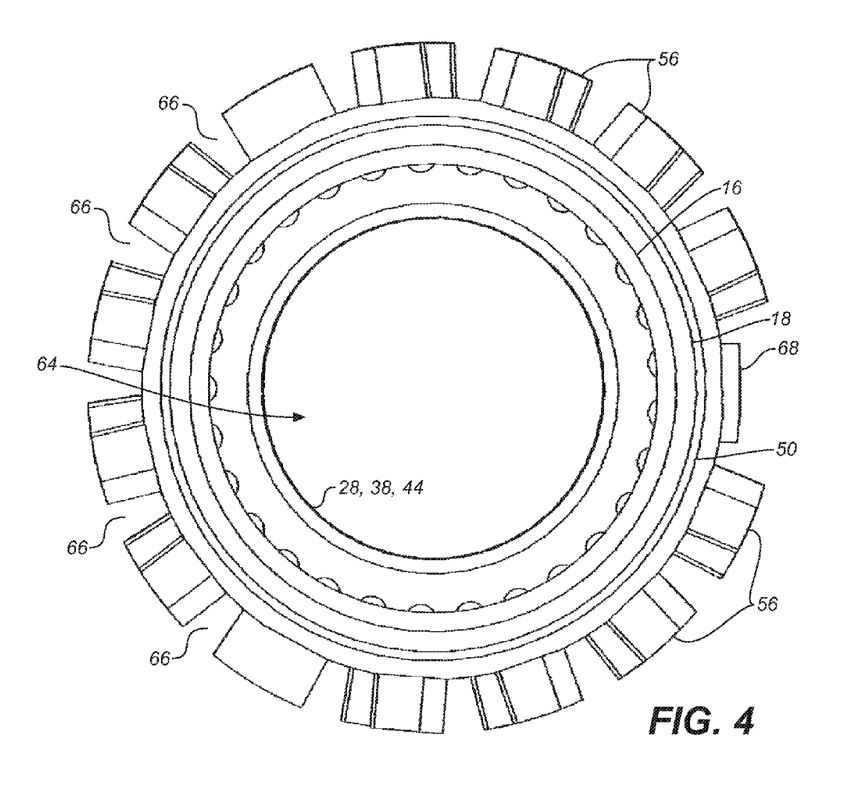
FIG. 4 is an end elevational view of the apparatus.

Once the assembled structure is inserted into a pipe, fluids flowing through the pipe will pass through a central flow channel bounded by the inner surfaces of the first end body, middle body and second end body 28, 38 & 44, and through an annular peripheral channel 66 bounded by the outer surfaces of the middle and end bodies, 12, 16 & 20 and the outer surfaces of the sleeves 14, 28 & 22, as can be understood in reference to FIGS. 2 and 4. Fluids passing through the peripheral channel 66 encounter portions of the contact plate 50 and flange 54 that extend radially beyond the tube bodies 12, 16 & 20 and sleeves 14, 28 & 22 which disturb the flow of the fluid, but more importantly must pass through and around angled fins 56. The fins 56 disturb and angularly divert flow of the fluid causing turbulence in the flow.

Figure 4A:
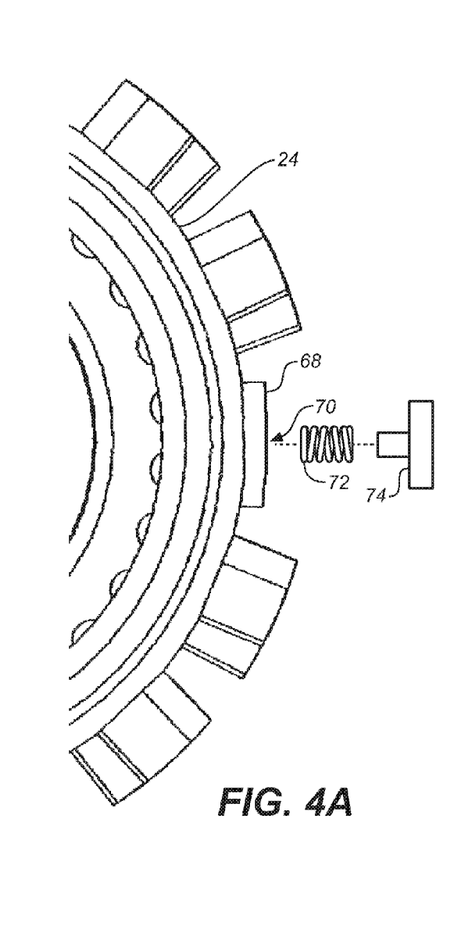
FIG. 4A is a close-up view of a portion of one of the spacer rings of the apparatus.
Figure 4B:
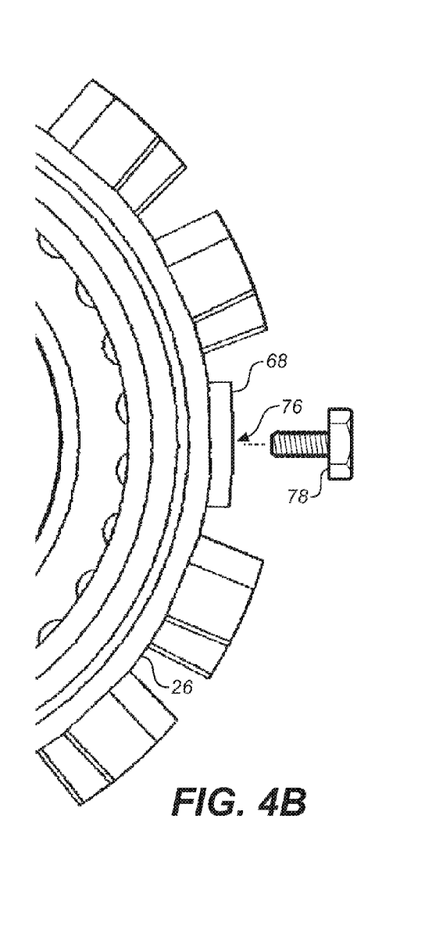
FIG. 4B is a close-up view of a portion of a second one of the spacer rings of the apparatus.

Referring now to FIGS. 1, 2 and 3, it is seen that each of the spacer rings 24, 26 include a fastener base 68. The fastener base 68 of the first spacer ring 24 includes an outwardly oriented post-receiving bore 70 in which is received a spring 72 and post 74. See FIG. 4A. The spring 72 and post 74 are sized so that when the spring 72 is relaxed the outer end of post 74 extends slightly beyond the outer diameter D, but that when the spring 72 is compressed, as by pressing the post 74 inward, the end of the post is positioned just inside of the outer diameter D. Similarly, the fastener base 68 of the second spacer ring 26 includes a threaded aperture 76 which threadedly receives bolt 78, as shown in FIG. 4B. Tightening and loosening bolt 78 in aperture 76 moves the head of the bolt inward and outward, respectively, of the outer diameter D.

The apparatus is installed in a pipe having an inner diameter slightly larger than the outer diameter D, by inserting the first end body into the pipe. The first spacer ring 24 can then be inserted into the pipe by pressing the post inward until it clears the inside wall of the pipe whereupon the spacer ring 24 can be slide into the pipe. The apparatus is then pushed further into the pipe until the second spacer ring 26 is positioned just inside the pipe opening. Then, loosening the bolt 78 moves it into engagement with the inner surface of the pipe and locks the second spacer ring 26, and hence the apparatus longitudinally in position in the pipe. Another section of pipe can then be joined to the section in which the apparatus is inserted to cover the second end body 20.

Once the apparatus is installed in the pipe, fluids flowing through the pipe will pass through the center and peripheral flow channels 64, 66 exposing the fluid to the magnetic fields radiating from the magnets installed in the middle and end tube bodies 12, 16 & 20 and the fluids flowing through the peripheral channel will be subject to turbulence cause by the spacing fins 56 of the first and second spacer rings 24, 26.

Figure 5:
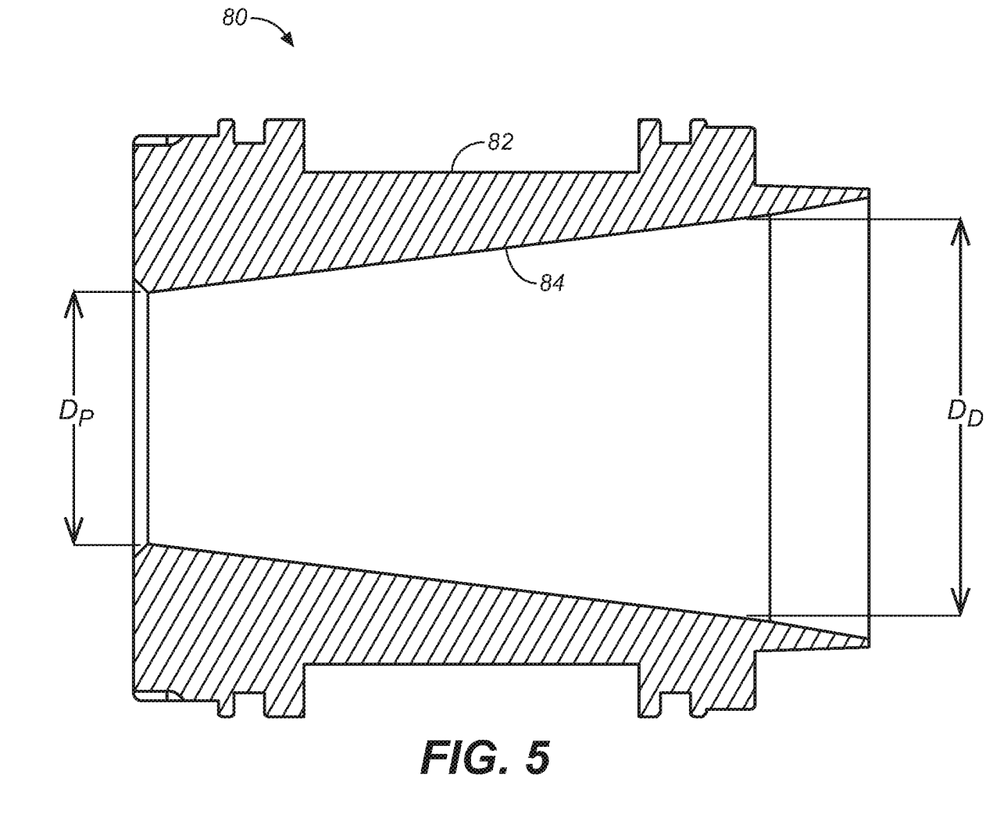
FIG. 5 is a sectional view of another embodiment of one of the end bodies of the apparatus.

In one embodiment, the first and second end bodies are identical. In a second embodiment 80, shown in FIG. 5, the second end body 82 is provided with a graduated inner surface 84 in which the diameter of the proximal end $D_P$ and the diameter of the distal end $D_D$ of the interior surface of the tube body are related according to the Golden Ratio. Two quantities are in the Golden Ration if their ratio is the same as the ratio of their sum to the larger of the two quantities. The Golden Ratio is usually defined as 1:1.61803398875.

In another embodiment, a second "middle" tube body is provided that can be attached to another middle tube body, such that it is interposed between a first middle body and the second end body. In this manner, the apparatus can be increased to whatever length is deemed appropriate under the circumstances thereby introducing as many magnets into a fluid carrying pipe as desired.

An apparatus for magnetic treatment of flowing fluids as described above is easy to install in a fluid carrying pipe, provides a modular structure for holding a large number of magnets in a single contained length, has a modular construction, and subjects a substantial portion of the flowing fluid to beneficial turbulence.

I claim:

1. An apparatus for magnetic treatment of fluids flowing through a pipe, said pipe having a longitudinal dimension and an inner surface having an inner diameter, said apparatus comprising:

a tubular, magnet-retaining body having a longitudinal dimension, an inner surface, an outer surface, a fluid inlet, and a fluid outlet opposite said fluid inlet, said inner surface defining a longitudinal inner flow channel extending between said fluid inlet and said fluid outlet, a plurality of magnets at least two of which are removably retained in said tubular body between said inner and outer surfaces, first and second positioning rings secured to said tubular body, said first and second positioning rings spaced apart along the longitudinal dimension of said tubular body, each positioning ring including a plurality of annularly distributed, radially extending turbulence fins ,each of said plurality of turbulence fins disposed angularly relative to a plane that is perpendicular to the longitudinal dimension of said tubular body, said fins forming an annular outer edge having a diameter slightly less than the inner diameter of the pipe, each positioning ring also having one or more radially extending support posts disposed in planar alignment with said fins, at least one of the support posts on said first positioning ring including an outwardly-opening, radially extending, pin-receiving bore, and an outwardly-biased retaining pin disposed in said bore, said retaining pin movable radially inward from a rest position to an inner position in which said pin is outwardly biased, at least one of the support posts on said second positioning ring including an outwardly-opening, radially-extending, threaded aperture, and a locking nut threadably engaged with said aperture, said locking nut moveable between retracted and extended positions by tightening and loosening said nut in said aperture, said tubular body and said positioning rings are for insertion into the pipe whereupon said positioning rings are disposed perpendicularly to and slidingly moveable along the longitudinal dimension of the pipe and snugly restrained against lateral movement against the inner surface of the pipe, the retaining pin is in said inner position and is biased against the inner surface of the pipe, the locking nut is in said retracted position, and said plurality of turbulence fins are spacing said tubular body from the inner surface of the pipe such that the outer surface of said tubular body and the inner surface of the pipe form an annular outer flow channel for fluids flowing through the pipe and said longitudinal inner flow channel is also for fluids flowing through the pipe, said fins are for creating turbulence in the fluids flowing through the outer flow channel, and said magnets are for creating a magnetic field to which fluids flowing though both the outer annular flow channel and the inner flow channel are exposed, wherein said tubular body and said positioning rings are longitudinally securable inside the pipe by loosening said locking nut to said extended position in which it firmly engages the inner surface of the pipe.

2. The apparatus for magnetic treatment of fluids of claim 1 wherein the tubular body is a middle body and further comprising:
   a pair of tubular, magnet-retaining end bodies, each of said end bodies having an inner surface, an outer surface, a proximal end, a distal end, and a longitudinal end channel extending between said proximal and distal ends, the proximal end of one of said pair of end bodies detachably attached to the fluid inlet of said middle body, the proximal end of the other of said pair of end bodies detachably attached to the fluid outlet of said middle body, said longitudinal end channels are in fluid communication with said longitudinal inner channel of said middle body, to form an inner flow channel extending from the distal end of one of said pair end bodies to the distal end of the other of said pair of end bodies,
   at least one of said plurality of magnets removably retained in each of said end bodies between the inner and outer surfaces thereof, and
   each of said first and second positioning rings is secured between said middle body and one of said pair of end bodies.

3. The apparatus for magnetic treatment of fluids of claim 2 wherein:
   the outer surface of each of said end bodies and the inner surface of the pipe form end body outer flow channels in fluid communication with the outer flow channel of said middle body to form an extended outer flow channel between said distal ends of said pair on end bodies, and
   said magnets retained in said end bodies are for creating a magnetic field to which fluids flowing through the extended flow channels are exposed.

4. The apparatus for magnetic treatment of fluids of claim 1 wherein:
   the retaining pin in said retracted position is biased against the inner surface of the pipe thereby partially retaining said tubular body and said positioning rings in the pipe against longitudinal movement.

5. The apparatus for magnetic treatment of fluids of claim 1 further comprising:
   a spring disposed in the bore of said one of the plurality of spacing posts on said first positioning ring the retaining pin disposed in the bore engaging said spring, in said inner position said retaining pin outwardly biased by said spring, and in said rest position said spring is relaxed.

6. The apparatus for magnetic treatment of fluids of claim 1 wherein:
   said turbulence fins and said one or more support posts of each of said first and second positioning rings collectively are circumferentially spaced apart equidistantly.

7. The apparatus for magnetic treatment of fluids of claim 1 wherein:
   said plurality of turbulence fins comprises three or more turbulence fins.

8. The apparatus for magnetic treatment of fluids of claim 1 wherein:
   said plane with which each of said plurality of turbulence fins is aligned intersects a center point of one of said positioning rings.

9. The apparatus for magnetic treatment of fluids of claim 1 wherein:
   each of said first and second positioning rings including an annular flange having an axially-extending, generally annular, outer face,
   and each of said plurality of turbulence fins and each of said one or more support posts extends from said outer face.

* * * * *